United States Patent
Lymberopoulos et al.

(10) Patent No.: US 6,625,513 B1
(45) Date of Patent: Sep. 23, 2003

(54) RUN-TO-RUN CONTROL OVER SEMICONDUCTOR PROCESSING TOOL BASED UPON MIRROR IMAGE TARGET

(75) Inventors: Dimitris Lymberopoulos, San Jose, CA (US); Terry Reiss, San Jose, CA (US); Arulkumar Shanmugasundram, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 434 days.

(21) Appl. No.: 09/639,140

(22) Filed: Aug. 15, 2000

(51) Int. Cl.$^7$ ............................................. G06F 19/00
(52) U.S. Cl. ................................. 700/121; 438/5
(58) Field of Search ...................... 700/121, 110, 700/109, 117, 78; 438/5, 17, 14, 15; 716/19, 21, 4

(56) References Cited

U.S. PATENT DOCUMENTS

| | | | | |
|---|---|---|---|---|
| 5,655,110 | A | * | 8/1997 | Krivokapic et al. .......... 716/19 |
| 5,917,919 | A | * | 6/1999 | Rosenthal ................. 381/71.11 |
| 5,926,690 | A | * | 7/1999 | Toprac et al. .................. 438/17 |
| 6,161,054 | A | * | 12/2000 | Rosenthal et al. ........... 700/121 |
| 6,230,069 | B1 | * | 5/2001 | Campbell et al. ............ 700/121 |
| 6,368,879 | B1 | * | 4/2002 | Toprac ............................ 438/5 |
| 6,388,253 | B1 | * | 5/2002 | Su .............................. 250/310 |
| 6,405,096 | B1 | * | 6/2002 | Toprac et al. ................ 700/121 |
| 6,438,440 | B1 | * | 8/2002 | Hayashi ....................... 700/121 |
| 6,445,969 | B1 | * | 9/2002 | Kenney et al. .............. 700/108 |

OTHER PUBLICATIONS

"Model–Based Control in Microelectronics Manufacturing", T.F. Edgar et al., 0–7803–5250–5/99/$10.00 © 1999 IEEE, pp. 4185–4191.

"Real–Time Control of Reactive Ion Etching Using Neural Networks", D. Strokes et al., Proceedings of the American Control Conference, Albuquerque, NM, Jun. 1997, 0–7803–3832–4/97/$10.00 © 1997 AACC, pp 1575–1578.

"An Adaptive Run–to–Run Optimizing Controller for Linear and Nonlinear Semiconductor Processes", Enrique Del Castillo et al., IEEE Transactions on Semiconductor Manufacturing, vol. II, No. 2, May 1998, pp 285–294.

"Run–to–run Control of Microlithography Overlay", Christopher Bode et al., http://www.che.utexas.exu/twmcc/presentations_0299/bode/sld001.ht., Slides 1–8.

"Pioneering Change in Fab Effectiveness for the Semic. . .", Paul J. O'Sullivan et al., Triant Technologies, Inc., http://www.triant.com/content–techpapers.html.

* cited by examiner

Primary Examiner—Leo Picard
Assistant Examiner—Zoila Cabrera
(74) Attorney, Agent, or Firm—Townsend and Townsend and Crew

(57) ABSTRACT

Run-to-run variation of a semiconductor fabrication tool is minimized utilizing a mirror image target. A goal represents a process result desired from operation of the tool. The mirror image target is generated by adding the goal to a difference between an output from a previous tool run and the goal. Prediction of tool performance is based upon a data-based modeling engine utilizing a reference library correlating operational parameters with observed process results for prior tool runs. The mirror image target vector is compared to the reference library and serves as a basis for generating the recipe for the subsequent process run. This recipe automatically brings operation of the tool back toward the goal. The method may further include comparison of the suggested recipe with the recipe of the prior run to determine whether run-to-run variation is serious enough to warrant a change in tool conditions, or whether run-to-run variation is so serious as to indicate a major tool problem. Generation of the mirror image target, and utilization of the mirror image target to create a new process recipe, eliminates effort and uncertainty associated with conventional nonsystematic analysis of tool variation, followed by manual intervention by the operator to adjust tool parameters to reduce such variation.

12 Claims, 4 Drawing Sheets

RUN-TO-RUN CONTROL OVER SEMICONDUCTOR PROCESSING TOOL BASED UPON MIRROR IMAGE TARGET

BACKGROUND OF THE INVENTION

As new generations of integrated circuit (ICs) employ smaller feature sizes than were contemplated in previous generations, greater demands are placed on the precision of the tools utilized to fabricate these integrated circuits. In particular, minor variation in tool results from run-to-run must be recognized and compensated for by the user.

FIG. 1 shows a schematic diagram of the functioning of a generic semiconductor fabrication system 100. Specifically, fabrication system 100 comprises inputs in the form of operational parameters 102a, 102b, and 102c supplied to fabrication tool 104. Operational parameters 102a–c are settings governing function of fabrication tool 104 for a particular run.

Based upon the input of operational parameters, tool 104 performs a fabrication process upon a semiconductor substrate. The character of this fabrication process is represented by process results 106a and 106b. Process results 106a and 106b may be data measured directly from the changed semiconductor substrate, or may be derived from data measured from the changed semiconductor substrate.

Under ideal conditions, fabrication tool 104 functions on every run to produce the same process result from given operational parameter settings. In reality however, operation of the fabrication tool is subject to a host of complex variables, not all of which can be reliably controlled by the user. Therefore, the performance of the fabrication tool will vary somewhat over time, and the relationship between given operational parameters and process results will drift from run-to-run.

Given the small tolerances of modern semiconductor devices, it is therefore necessary to adjust the operational parameters of the fabrication tool from run-to-run in order to compensate for variation and bring drifting process results back to a desired goal. Conventionally, the user is required to manually determine operating conditions at which the corresponding process results would move back into line with a desired goal. However, the act of generating operating conditions is frequently performed non-systematically by trial and error utilizing operator intuition. Because it lacks a consistent methodology however, correction of process variation by conventional methods is time consuming, error prone, and inconsistent from run-to-run, tool-to-tool, and user-to-user.

Accordingly, new techniques for minimizing run-to-run variation in process results of semiconductor fabrication tools are desirable.

SUMMARY OF THE INVENTION

The present invention relates to a method for minimizing run-to-run variation in operation of a semiconductor fabrication tool. In one embodiment, run-to-run variation in process results are minimized by comparing an output from a most recent processing run to a desired fixed goal. A difference between the fixed goal and the output is then calculated. Addition of the difference to the fixed goal creates a mirror image of the output around the fixed goal. The mirror image is used as a target to predict tool behavior for a subsequent processing run in order to bring process results closer to the desired goal.

The method in accordance with the present invention is particularly suited for minimizing variation of a semiconductor fabrication process whose behavior is predicted utilizing a data-based modeling engine. However, the present invention is not limited to controlling this type of fabrication process.

One embodiment of the method in accordance with the present invention comprises the steps of determining a goal of a process result sought to be produced by the tool, and detecting an actual output of the process result from a most recent run of the tool according to an initial recipe. A difference is calculated by subtracting the goal from the actual output, and a mirror image target is calculated by adding the difference to the goal. A suggested recipe is generated from the mirror image target; and a subsequent run of the tool is performed utilizing the suggested recipe to produce a second actual output of the process result that is similar to the goal.

These and other embodiments of the present invention, as well as its advantages and features, are described in more detail in conjunction with the text below and attached figures.

DESCRIPTION OF THE SPECIFIC EMBODIMENTS

The method of the present invention can be employed to minimize run-to-run variation of a variety of semiconductor processes, including but not limited to deposition processes, etch processes, and implantation processes. For purposes of illustration however, the following detailed description focuses upon a method relating to minimizing run-to-run variation in operation of a chemical mechanical polishing (CMP) tool utilizing a data-based modeling engine.

I. An Exemplary CMP System Configured to Practice the Present Invention

Figure 1:
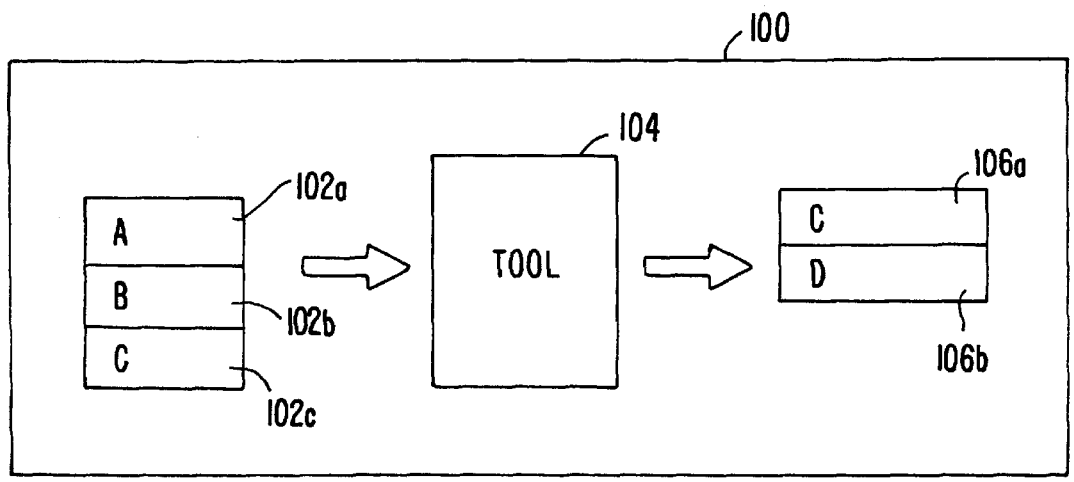
FIG. 1 is a schematic representing operation of a generic semiconductor fabrication tool.
Figure 2:
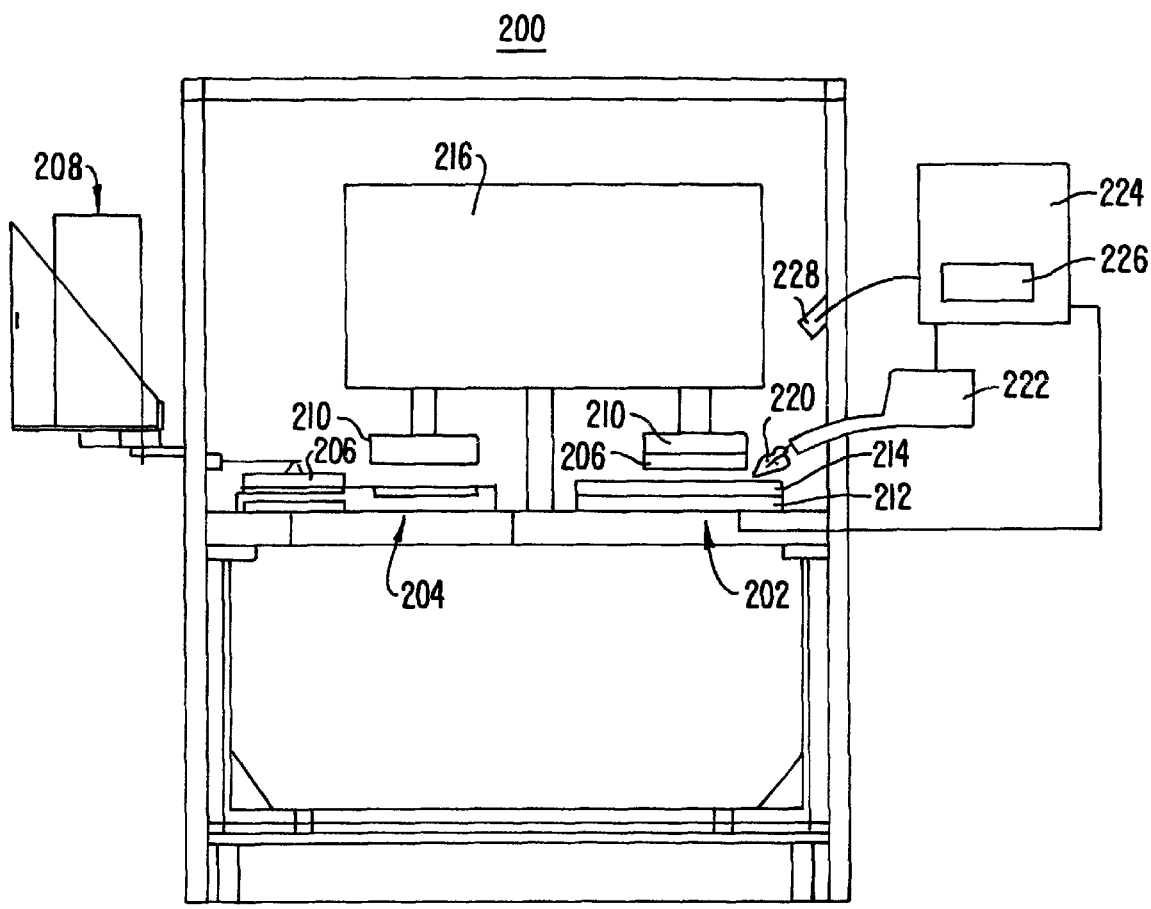
FIG. 2 shows a CMP tool suitable for run-to-run control in accordance with one embodiment of the present invention.

FIG. 2 shows a simple schematic diagram of a chemical mechanical polishing (CMP) tool 200. Tool 200 can be a Mirra® CMP tool manufactured by Applied Materials, Inc. of Santa Clara, Calif. A description of a similar polisher may be found in U.S. Pat. No. 5,738,574, the entire disclosure of which is incorporated herein by reference. CMP tool 200 includes a series of polishing stations 202 and a transfer station 204. Transfer station 204 serves multiple functions, including receiving individual substrates 206 from robot 208, washing substrates 206, and loading substrates 206 onto carrier heads 210.

Typically, each polishing station 202 includes a rotatable platen 212 that supports a polishing pad 214, e.g. a standard or fixed-abrasive or polishing pad. Rotatable carousel 216 holds four carrier heads 218 supported above the polishing stations 202. Carousel 216 rotates to carry substrates 206 between polishing stations 202 and transfer station 204.

In normal operation of CMP tool 200, an unpolished substrate is retrieved by robot 208 and placed into transfer station 204. From transfer station 204, carrier head 218 engages substrate 206 by vacuum suction, and then places substrate 206 into contact with rotating platen 212 and polishing pad 214. Slurry 220 is dispensed from slurry reservoir 222 onto the surface of pad 214 and pad 214 is biased against the surface of substrate 206 and rotated. The contact of pad 214 against the surface of substrate 206 results in the removal of semiconductor material from substrate 206 by a combination of chemical and mechanical action.

Processor 224 controls operation of CMP tool 200 by executing computer instructions stored in a memory 226. Processor 224 is in electrical communication with, and exerts control over, operation of platen 212 and slurry reservoir 222. In this manner, processor 224 determines operational parameters of the speed of rotation of platen 212 and the pressure applied by pad 214, and also the pH of dispensed slurry 220 from reservoir 222.

Tool 200 further includes sensors 228. Sensors 228 receive data from substrate 206. Sensors 228 can be part of an in-situ monitoring system at the polishing station, or can be part of an in-line or off-line metrology station. Data from sensors 228 is communicated to processor 224, which then determines process results of substrate thickness and polish uniformity based upon the operation of tool 200. Processor 224 also contains circuitry for performing the method of run-to-run control whose steps are detailed below.

II. Minimizing Run-to-Run Variation in Accordance With One Embodiment of the Present Invention.

Figure 3:
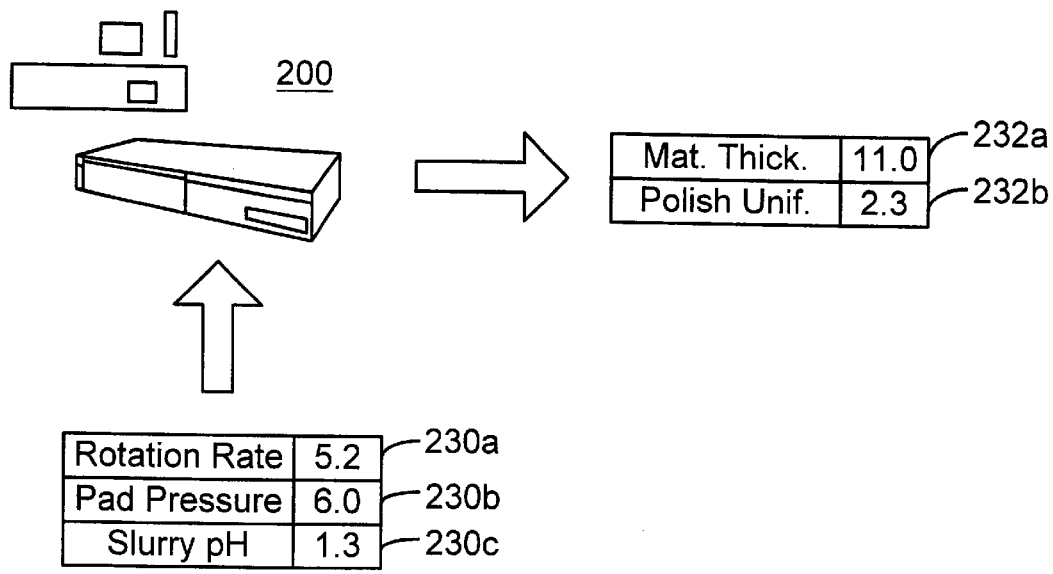
FIG. 3 is a schematic representing operation of a CMP fabrication tool.

FIG. 3 shows a schematic diagram representing the functioning of the CMP tool of FIG. 2. CMP tool 200 receives inputs in the form of operational parameters 230$a$–$c$. As shown in FIG. 3, categories of operational parameters 230$a$–$c$ input to CMP tool 200 include platen rotation rate, pad pressure, and slurry pH. However, these categories of operational parameters are merely examples and other categories of CMP operational parameters could be utilized by the present invention.

Based upon operational parameters 230$a$–$c$, CMP tool 200 functions to lanarize a semiconductor substrate. The character of this planarization is represented by process results 232$a$–$b$. As shown in FIG. 3, process results 232$a$–$b$ for CMP tool 200 include thickness of semiconductor material remaining after polishing, and uniformity of semiconductor material removed from the substrate. Again, these categories of process results are merely examples and other categories of results from CMP processing could be utilized by the present invention.

Ideally, CMP tool 200 will function on every run to produce the same process result values from given operational parameters. In reality however, CMP tool 200 is extremely complex and its operation is subject to a host of variables, only some of which can be reliably controlled by the user. Therefore, performance of CMP tool 200 will vary or drift over time.

Given the drift in the relationship between input operational parameters and output process results from run-to-run, the operator must be able to predict process results given modified tool operational parameters. This prediction is accomplished through the use of modeling.

Figure 4:
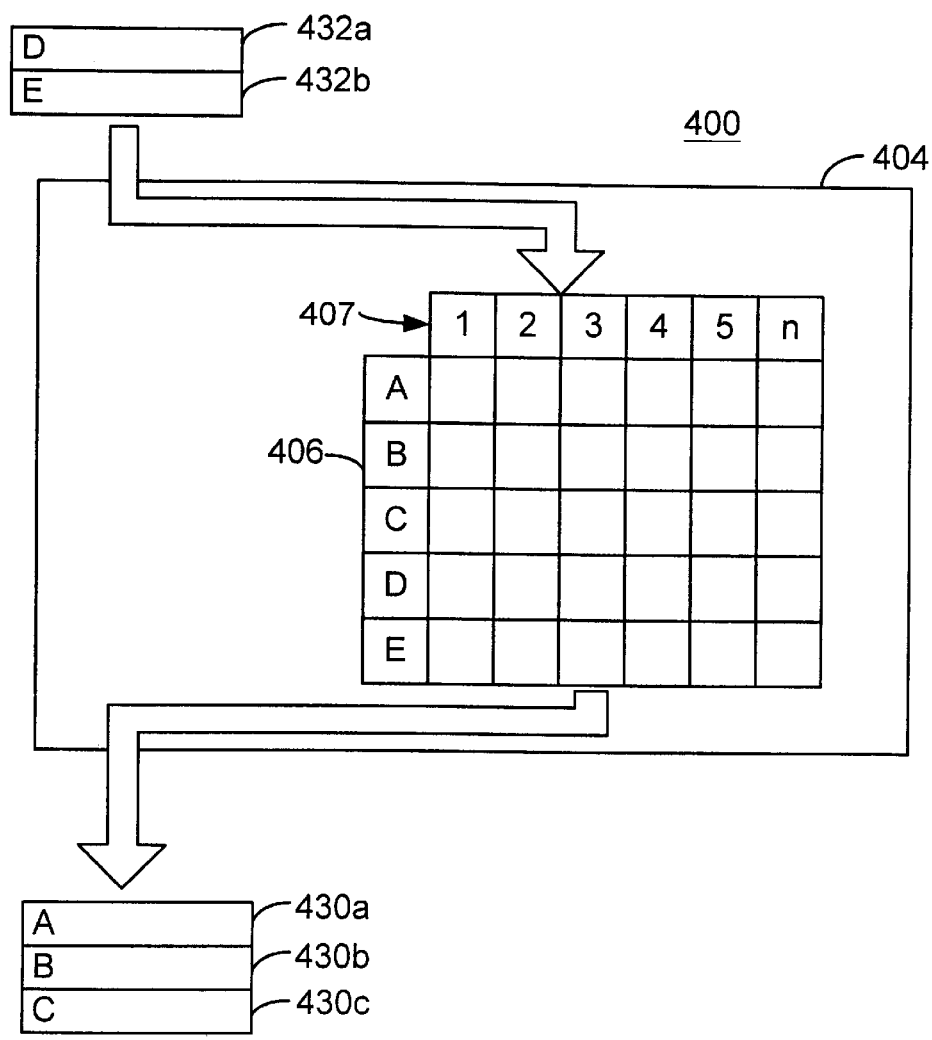
FIG. 4 is a schematic diagram representing a feed-forward data-based model for the CMP tool shown in FIG. 2.

FIG. 4 shows a schematic view of a feed-forward model for predicting behavior of a CMP fabrication tool. Model 400 operates solely upon the basis of data collected from prior tool runs. Specifically, desired process results 432$a$–$b$ are supplied as an input to modeling engine 404. Modeling engine 404 includes library 406 of process results obtained from prior tool runs 407 under a variety of operational parameters. Based upon process results 432$a$–$b$ input to engine 404, engine 404 references library 406 and outputs modeled operational parameters 430$a$–$c$ most likely to produce process results 432$a$–$b$.

The prediction of data-based modeling engine 404 is determined solely by actual data compiled in reference library 406. Specifically, modeling engine 404 is limited to comparing the process result supplied to data in the form of specific prior fabrication runs. Data-based modeling engine 404 does not attempt to generalize the relationship between prior process results and corresponding operational parameters utilizing a mathematical formula or equation. Because data-based modeling engine 404 considers as inputs only process results reflecting a fixed desired goal, engine 404 will repeatedly output the same process parameters regardless of actual tool performance. Data-based modeling engine 404 thus cannot account for drift in the input-output relationship of a complex fabrication tool.

Figure 5:
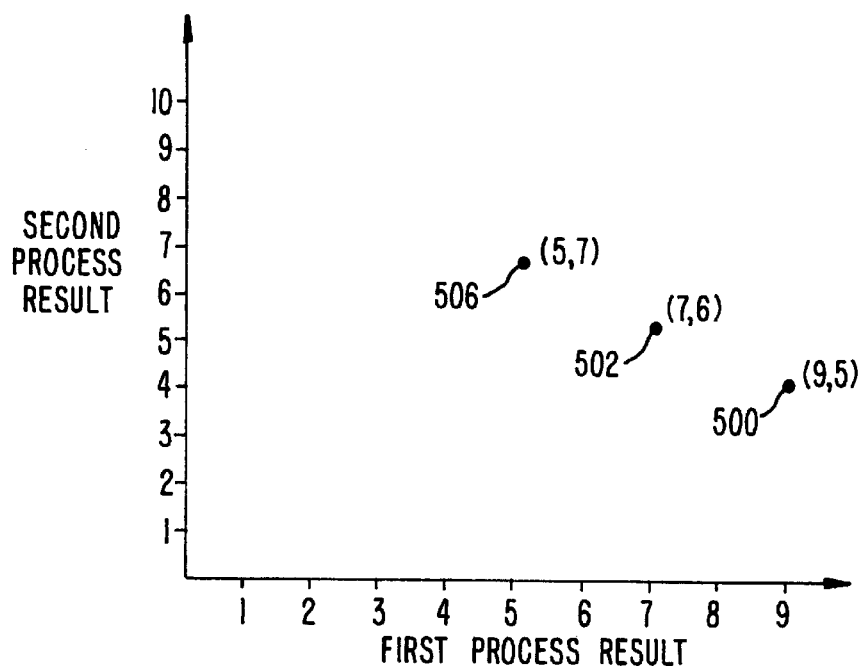
FIG. 5 is plots a second process result versus a first process result and illustrates the general approach of a run-to-run control method in accordance with one embodiment of the present invention.

Accordingly, FIG. 5 shows the general approach to run-to-run control in accordance with one embodiment of the present invention. Actual output 500 comprising first and second process results of a fabrication tool are compared with a desired fixed goal 502 to create a mirror image target 506 about goal 502. As explained in detail below, this mirror image target is then fed to a data-based modeling engine to produce operational parameters calculated to bring operation of the fabrication tool back toward the desired fixed goal 502.

Figure 6:
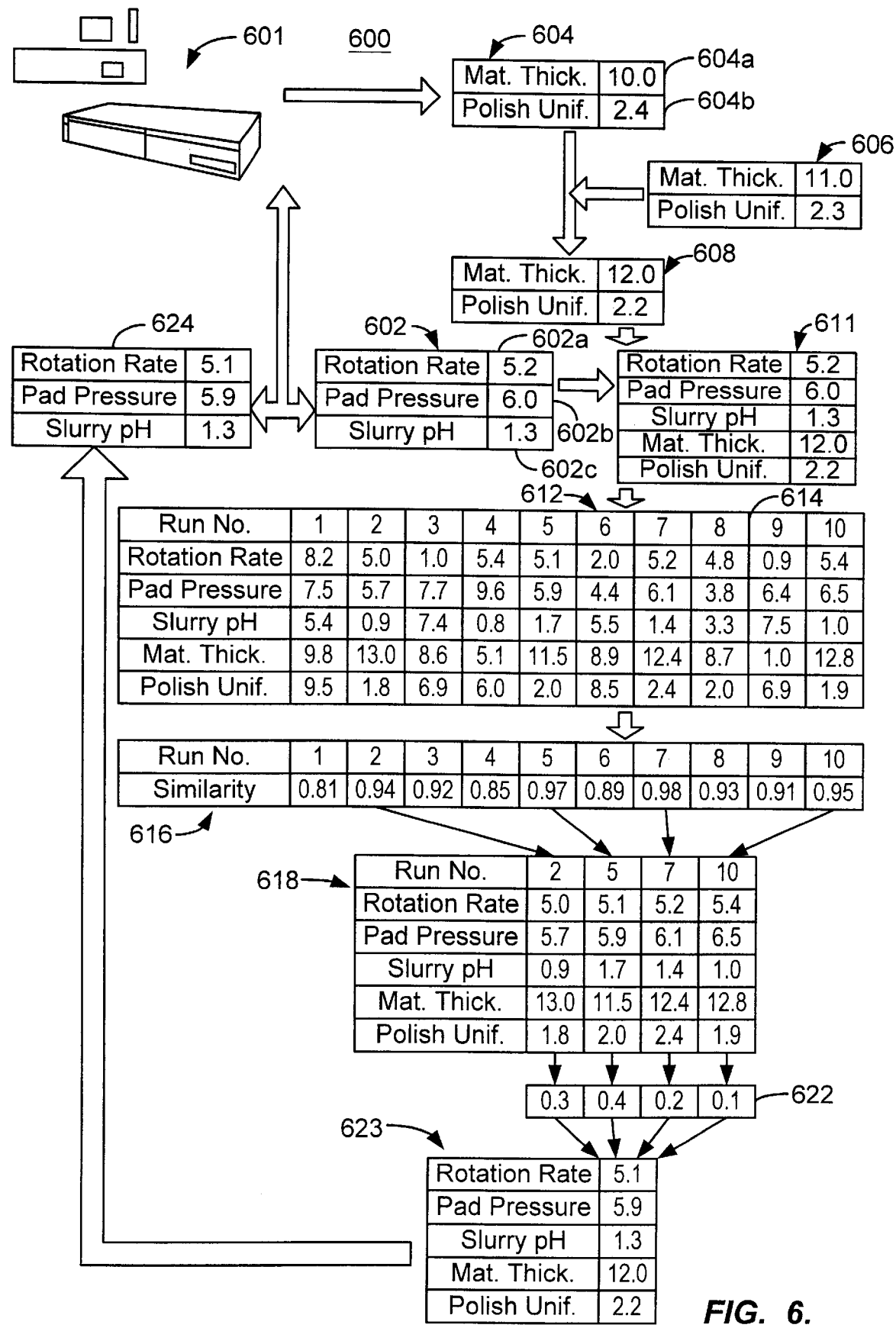
FIG. 6 is a flow chart illustrating the detailed steps of one embodiment of a method for run-to-run control over a CMP tool in accordance with the present invention.

FIG. 6 shows the detailed steps of method 600 for run-to-run control over CMP tool 601 to compensate for variation and bring the process results closer to a desired goal.

CMP tool 601 receives an initial recipe 602 comprising operational parameters 602$a$–$c$ of pad rotation rate, pad pressure, and slurry pH. CMP tool 601 is then operated according to initial recipe 602 to perform a CMP process on a substrate, such that output vector 604 comprising process results 604$a$–$b$ of material thickness and polish uniformity is produced.

As shown in FIG. 6, operation of CMP tool 601 at an initial recipe 602 of pad rotation rate of 5.2, pad pressure of 6.0 and slurry pH of 1.3 produces output vector 604 of material thickness of 10.0 and polish uniformity of 2.4. The valves given for the operational parameters 602$a$–$c$ and corresponding process results 604$a$–$b$ are for illustration purposes only, and do not necessarily reflect operational parameters or sensed etch results of an actual plasma etching tool.

FIG. 6 shows the next step of run-to-run control method 600, wherein output vector 604 is compared with goal vector 606 to generate mirror image target vector 608. Goal vector 606 comprises the same two components (material thickness and polish uniformity) comprising output vector 604. Values of the process results for goal vector 606 are those sought to be achieved by operation of the tool.

Mirror image target vector 608 represents changed process results providing a basis for prediction of operational parameters giving rise to goal vector 606. Specifically, mirror image target vector 608 represents the sum of goal vector 606 and the difference between output vector 604 and goal vector 606:

$$\text{mirror image vector} = \text{target vector} + (\text{output vector} - \text{target vector}). \quad (I)$$

Figure 7:
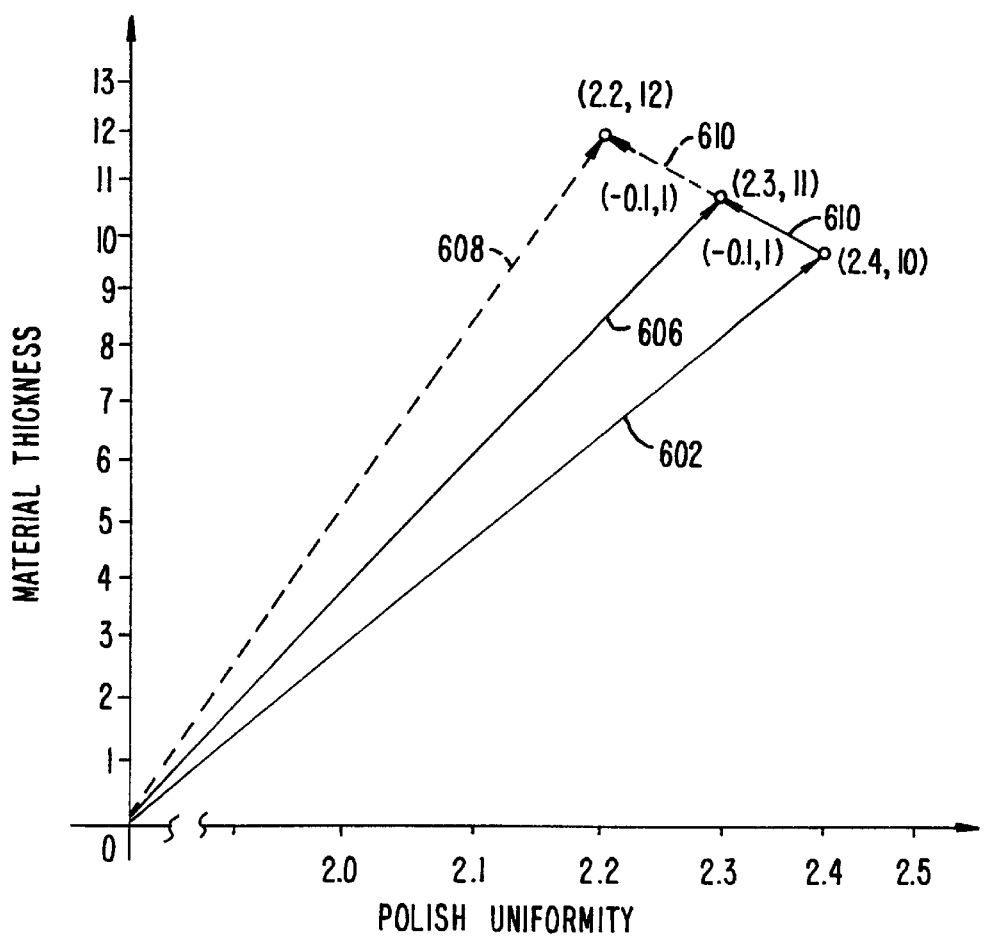
FIG. 7 plots material thickness versus polish uniformity and illustrate generation of the mirror image vector from the target vector and the most recent output vector.

FIG. 7 plots material thickness versus polish uniformity and depicts alculation of mirror image target vector 608 from goal vector 606 and output vector 602. The first step in generating mirror image target vector 608 is to plot the process results of goal vector 606 and output vector 602. Difference vector 610 corresponds to the difference between output vector 602 and goal vector 606. Here, difference vector 610 has a polish uniformity component of −0.1 (2.3−2.4=−0.1) and material thickness component of 1.0 (11−10=1.0).

Mirror image target vector 608 is then generated from the sum of difference vector 610 and goal vector 606. Here, mirror image target vector 608 has a polish uniformity of 2.2 (−0.1+2.3=2.2) and a material thickness of 12.0 (1+11.0= 12.0). Mirror image target vector 608 represents conditions anticipated to bring operation of tool 601 back to the desired goal on a subsequent processing run.

In the next step of the run-to-run control method 600, mirror image target vector 608 is combined with operational parameters 602*a*–*c* of initial recipe 602 to produce reference vector 611. Reference vector 611 is then compared to library data file 612. Library data file 612 is a compilation of individual vectors 614 reflecting prior process results corresponding to a variety of operational parameters.

Comparison of reference vector 608 to library data file 612 generates similarity coefficient 616 for each vector 614 of library data file 612. In method 600, the value of similarity coefficient 616 is calculated utilizing the K-nearest neighbor approach, as would be understood by a person of ordinary skill in the art. This ensures that the least amount of change is made to output vector 102 of the most recent run in order to correct for variation.

In run-to-run control method 600, calculation of similarity coefficient 616 is based not only on process results but also upon operational parameters. This serves as a check on the similarity determination, ensuring that vector 614 producing similar process results from radically different operational parameters is not considered similar. Depending upon the method chosen to calculate the value of the similarity coefficient 616, similarity coefficient 616 may discount or emphasize the effect of similarity between operational parameters versus similarity between sensed etch results, for reference vector 611 and individual vectors 614 of library 612.

Based upon a cut-off value for similarity coefficient 616 (here ≧0.94), subset 618 of individual vectors 620 closely resembling reference vector 608 is compiled from library data file 612. Subset 618 reflects tool operating parameters most likely to produce an output vector corresponding to mirror image target vector 608.

In the next step, weights 622 are assigned to each individual vector 620 of subset 618. The method of assigning weights 622 can again vary depending upon characteristics of a particular etch process and/or operator preference. In particular embodiments, weights may be assigned to individual vectors based upon a formula that takes into account the similarity coefficient described above.

Weighted vectors of subset 618 are then linearly added to produce combined vector 623. The operational parameter information of combined vector 623 represents suggested recipe 624 that is intended to bring CMP process back into conformity with goal vector 606.

Based upon a comparison between initial recipe 602 and suggested recipe 624, a decision is made whether or not to alter the operational parameters of CMP tool 601. Where suggested recipe 624 represents a relatively minor change reflecting some variation from initial recipe 602, CMP tool 601 may utilize suggested recipe 624 in the subsequent run in order to correct for variation.

Where, however, suggested recipe 624 is extremely similar to initial recipe 602, a decision may be made not to disturb existing tool conditions and suggested recipe 624 may be not be adopted by tool 601. The subsequent processing run of tool 601 would simply implement initial recipe 602.

Where suggested recipe 624 represents a radical departure from initial recipe 602, a serious problem with tool 601 may be indicated. Under such circumstances, the tool may also disregard suggested recipe 624 and instead emit an alarm alerting the operator to the problem. Conditions governing an appropriate course of action in a specific case may be programmed according to preferences of the operator or to dictates of a particular application.

If a decision is ultimately made to provide suggested recipe 624 to etch tool 601, the next run of etch tool 601 will conform to the operational parameters provided by suggested recipe 624. These operational parameters would be expected to bring operation of tool 601 back toward goal vector 606. In this manner, run-to-run control over the etching process is accomplished.

The method of run-to-run control in accordance with one embodiment of the present invention offers a number of advantages over prior techniques. One advantage is reduction in effort required by the operator. Specifically, based upon observed outputs of the tool, the mirror image target is automatically calculated by the processor controlling the tool. Apart from possibly approving or disregarding the recipe suggested by the method, no manual intervention by the operator is required to accomplish run-to-run control, and the operator can focus on other tasks.

Another important advantage of the method in accordance with one embodiment of the present invention is reduction in nonuniformity of run-to-run control. Previously, the tool operator was required to manually determine operating parameters at which the corresponding process results would move the tool back in line with a desired goal. However, the act of generating such operating conditions was frequently performed by trial and error in a non-systematic way. Because the conventional technique lacked a consistent methodology, correction of process variation was inconsistent from run-to-run, tool-to-tool, and user-to-user.

With the present invention, run-to-run control is automated and performed according to objective variables such as measured process results and a predetermined goal. This approach leads to consistent manipulation of the tool and to readily reproducible results.

The method in accordance with one embodiment of the present invention also offers the advantage of increased responsiveness. Rather than requiring the operator to measure process results and perform adjustments based upon manual calculations, the present technique performs these tasks automatically at the conclusion of each fabrication run. The operator is provided with a suggested recipe almost instantaneously, and has plenty of time to consider other factors in deciding whether or not to implement the suggested recipe in the next tool run.

Having fully described at least one embodiment of the present invention, other equivalent or alternative methods for controlling a semiconductor fabrication process according to the present invention will be apparent to those skilled in the art. For example, while the present invention was primarily described above in conjunction with run-to-run control over a CMP tool, the invention can be used to monitor and control a variety of other semiconductor fabrication processes. Thus, variation in results of a plasma etching process over a succession of runs could be controlled in accordance with one embodiment of the present invention. In such an embodiment, process results such as removal rate and etch uniformity could form the components of the output and goal vectors employed to calculate the mirror image target vector, with operational parameters such as chamber pressure, temperature, and RF power forming components of the suggested recipe.

Moreover, while the method is described above in connection with a process for controlling run-to-run variation in a tool used to fabricate a semiconductor device such as an IC or flat panel display, the present invention is not limited to this type of application. Generation of a mirror image target from an output and a goal could be utilized to control variation of other types of processes, and the method would still remain within the scope of the present invention.

In addition, while the present invention is described in connection with a process modeled utilizing a data-based modeling engine, the present invention is not limited to such a process. Run-to-run control over a process modeled by a variety of other types of modeling engines could also be exercised in accordance with the present invention.

Furthermore, while the method is described showing generation of a mirror image target vector from the goal vector and output vector in two-dimensional space, this is also not required by the present invention. The mirror image vector could be generated from output and goal vectors reflecting three, four, or even N different process results, with the output, goal, difference, and mirror image target vectors correspondingly plotted in N-dimensional space.

Moreover, where a data-based reference library is used to generate the suggested recipe from the mirror image target, approaches other than K-nearest neighbor could be used to determine the similarity coefficient from which the vector subset is generated.

In addition, the method described above may cause oscillation of operational parameters and sensed results between suggested recipes over consecutive tool runs. Such oscillation would likely occur around a desired goal that is never precisely met, and may be attributable to features of the modeling engine rather than actual run-to-run variation. In order to eliminate such meaningless, repeated cycling of process parameters, the method may include the use of a damping factor.

For example, in the method described above in connection with FIG. 6, a damping factor could be utilized in generating the mirror image target vector from the goal vector according to Equation (II) below:

$$\text{mirror image vector} = \text{target vector} + A*(\text{output vector} - \text{target vector}), \text{ where} \quad (II)$$

A represents a damping factor of between 0 and 1 and reflects any prior repeated fluctuation of the results of prior process runs.

Given the above detailed description of the present invention and the variety of embodiments described therein, these equivalents and alternatives along with the understood obvious changes and modifications are intended to be included within the scope of the present invention.

What is claimed is:

1. A method for minimizing run-to-rum variation of a semconductor processing tool, the method comprising:

determining a goal of a process result sought to be produced by the tool;

detecting an actual output of the process result from a most recent run of the tool according to an initial recipe;

calculating a difference by subtracting the goal from the actual output;

calculating a mirror image target by adding the difference goal;

generating a suggested recipe from the mirror image target by comparing the mirror image target with a data library of prior process results and corresponding operational parameters, generating a subset of process results and corresponding operational parameters from the data library based upon a similarity with the mirror image target, and combining the operational parameters of the subset to produce the suggested recipe; and performing a subsequent of the tool utilizing the suggested recipe to produce a second actual output of the process result similar to the goal.

2. A method according to claim 1 wherein combining the operational parameters of the subset comprises:

assigning weights to the subset; and linearly combining the weighted operational parameters.

3. A method according to claim 1 wherein generating the subset includes calculating the similarity based upon a K-nearest neighbor approach.

4. A method according to claim 3 further comprising comparing the suggested recipe with the initial recipe to determine whether or not to perform the subsequent run of the tool utilizing the suggested recipe.

5. A method according to claim 3 comprising employing a damping factor to eliminate repeated fluctuation between the same values of suggested recipes from prior runs.

6. A method according to claim 5 wherein employing a damping factor comprises multiplying the difference by a coefficient of between 0 and 1 before adding the difference to the goal.

7. A method according to claim 1 wherein generating the subset comprises determining similarity utilizing the operational parameters and the process results of the mirror image target.

8. An apparatus for processing a substrate, said apparatus comprising:

a substrate processing station;

a sensor operatively coupled to said substrate processing station to detect a sensed result from the substrate;

a computer processor controlling an operational parameter for the operation of said apparatus; and a memory coupled to said computer controller, said memory storing a computer program in computer readable format including computer instructions to control said apparatus to, a) provide a goal of a process result sought to be produced by the tool, b) detect an actual output of the process result from a most recent run of the tool according to an initial recipe, c) calculate a difference by subtracting the goal from the actual output
d) calculate a mirror image target by adding the difference to the goal,
e) generate a suggested recipe from the minor image target by generating a subset of process results and corresponding operational parameters from a data library based upon a K-nearest neighbor similarity with the mirror image target, by,
   comparing the mirror image target with the data library of prior process results and corresponding operational parameters,
   generating the subset of process results and corresponding operational parameters from the data library based upon a K-nearest neighbor similarity with the mirror image target, and
   combining the operational parameters of the subset to produce the suggested recipe; and
f) perform a subsequent run of the tool utilizing the suggested recipe to produce a second actual output of the process result that is similar to the goal.

9. The apparatus of claim 8 wherein said substrate processing station is a plasma etching chamber.

10. The apparatus of claim 9 wherein the process result comprises at least one of a removal rate and an etch uniformity.

11. The apparatus of claim 8 wherein said substrate processing station is a chemical mechanical polishing station.

12. The apparatus of claim 11 wherein the process result comprises at least one of a material thickness and a polish uniformity.

* * * * *